US011422805B1

(12) United States Patent
Kelly et al.

(10) Patent No.: US 11,422,805 B1
(45) Date of Patent: Aug. 23, 2022

(54) SORTING BY PERMUTATION

(71) Applicant: Amazon Technologies, Inc., Seattle, WA (US)

(72) Inventors: Terence Kelly, Redwood City, CA (US); Andrew Edward Caldwell, Santa Clara, CA (US); Carlos Garcia-Alvarado, Gilroy, CA (US); Vijairam Parasuraman, Union City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 631 days.

(21) Appl. No.: 15/707,992

(22) Filed: Sep. 18, 2017

(51) Int. Cl.
*G06F 7/76* (2006.01)
*G06F 7/24* (2006.01)
*G06F 9/30* (2018.01)
*G06F 16/901* (2019.01)
*G06F 16/903* (2019.01)

(52) U.S. Cl.
CPC .......... *G06F 9/30032* (2013.01); *G06F 7/766* (2013.01); *G06F 16/902* (2019.01); *G06F 7/24* (2013.01); *G06F 16/90348* (2019.01)

(58) Field of Classification Search
CPC .... G06F 9/30032; G06F 16/902; G06F 7/766; G06F 16/90348; G06F 7/24
See application file for complete search history.

(56) References Cited

U.S. PATENT DOCUMENTS

| | | | |
|---|---|---|---|
| 2008/0059492 A1* | 3/2008 | Tarin | G06F 16/221 |
| 2011/0214049 A1* | 9/2011 | Listou | G06F 40/10 715/227 |
| 2011/0307774 A1* | 12/2011 | Listou | G06F 3/0481 715/227 |
| 2012/0323923 A1* | 12/2012 | Duan | G06F 16/24554 707/741 |
| 2014/0164402 A1* | 6/2014 | Haws | G06F 7/08 707/752 |
| 2014/0201244 A1* | 7/2014 | Zhou | G06F 16/00 707/803 |
| 2015/0363443 A1* | 12/2015 | Kaushik | G06F 16/221 707/723 |
| 2017/0293469 A1* | 10/2017 | Attaluri | G06F 7/24 |

* cited by examiner

*Primary Examiner* — Alicia M Willoughby
(74) *Attorney, Agent, or Firm* — Davis Wright Tremaine LLP

(57) ABSTRACT

A system such as a database management system determines a rule to impose sorted order upon a column without applying a sorting algorithm to the column and stores the rule to be applied to sort the column. In an embodiment, a permutation is the rule. The column, in an embodiment, is a column of a database table. In some cases, the rule is used to efficiently impose a correct sorted order on a subset of unsorted columns without the use of a sorting algorithm. In some cases, the rule is generated based at least in part on another column that is sorted using a sorting algorithm such as quicksort.

19 Claims, 9 Drawing Sheets

FIG. 3

Table 302A

| | K | C | P |
|---|---|---|---|
| [0] | 1 | E | 6 |
| [1] | 1 | B | 3 |
| [2] | 1 | G | 7 |
| [3] | 2 | A | 1 |
| [4] | 3 | C | 4 |
| [5] | 4 | A | 2 |
| [6] | 5 | - | 8 |
| [7] | 7 | - | 9 |
| [8] | 9 | D | 5 |
| [9] | 9 | A | 0 |

Table 302B

| | K | C | P |
|---|---|---|---|
| [0] | 1 | A | 6 |
| [1] | 1 | A | 3 |
| [2] | 1 | A | 7 |
| [3] | 2 | B | 1 |
| [4] | 3 | C | 4 |
| [5] | 4 | D | 2 |
| [6] | 5 | E | 8 |
| [7] | 7 | G | 9 |
| [8] | 9 | - | 5 |
| [9] | 9 | - | 0 |

SORTING BY PERMUTATION

BACKGROUND

Database systems are used in a wide variety of contexts, and are useful for building many types of applications, services, platforms, and more. In many cases, databases are used to store structured data in a format in which data can be created, retrieved, updated, and deleted in an efficient manner. It is also becoming increasingly important for database systems to be capable of providing features such as the ability to perform expedient data queries and the ability to provide a large data throughput. However, as the size of data sets maintained by the database systems increases, certain database systems may not be optimally scaled and may incur performance penalties. Further, as the size of data sets increases, the throughput achieved by some database system decreases and the computational cost of performing data queries, data updates and other operation increases.

In many cases, maintaining large amounts of data in a structured and organized manner is challenging. Indexing data of a database is not always possible or can be impractical in some cases, and sorting a database presents many challenges because large databases may have millions or even billions of rows of data that require a large amount of computational resources such as processor time, memory, and/or battery usage to sort.

BRIEF DESCRIPTION OF THE DRAWINGS

Various techniques will be described with reference to the drawings, in which:

FIG. 3 illustrates a diagram of a sorted order being imposed on a column, in accordance with one embodiment;

DETAILED DESCRIPTION

In an embodiment, a relational database is used to store data in one or more tables such that database tables are organized in rows and column. Database tables, in an embodiment, are sorted such that values in one or more specified columns appear in an order (e.g., ascending or descending order). Methods described herein for sorting subsets of columns in a table are usable to impose a correct sorted order on tables in an incremental or on-demand manner as opposed to sorting the entire table at once, thereby reducing the up-front cost of sorting a database table.

In an embodiment, a permutation is defined by data that represents how to re-arrange rows of an original unsorted key column into their final sorted order—accordingly, a permutation can be utilized (e.g., by a relational database management system) to efficiently impose a correct sorted order on arbitrary subsets of unsorted non-key columns without the use of any sorting algorithm. In an embodiment, a database table is sorted in the following manner: a system (e.g., a database management system) sorts data for one or more key columns of a database table that define a sort order where the sort is performed using any suitable sorting algorithm and omits sorting at least some of the non-key columns; as part of sorting the one or more key columns, the system obtains a permutation that expresses how to re-arrange the rows of the original unsorted key columns into the final sorted order; and at a later point in time (e.g., when the data for a non-key column is received), the system uses the permutation to impose a sorted order on some or all of the unsorted non-key columns in linear time (i.e., in time proportional to the number of rows). Sorting of the non-key columns may, in some embodiments, be parallelized such that correct sorted order is imposed concurrently on multiple columns by different computing entities (e.g., different computing devices).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
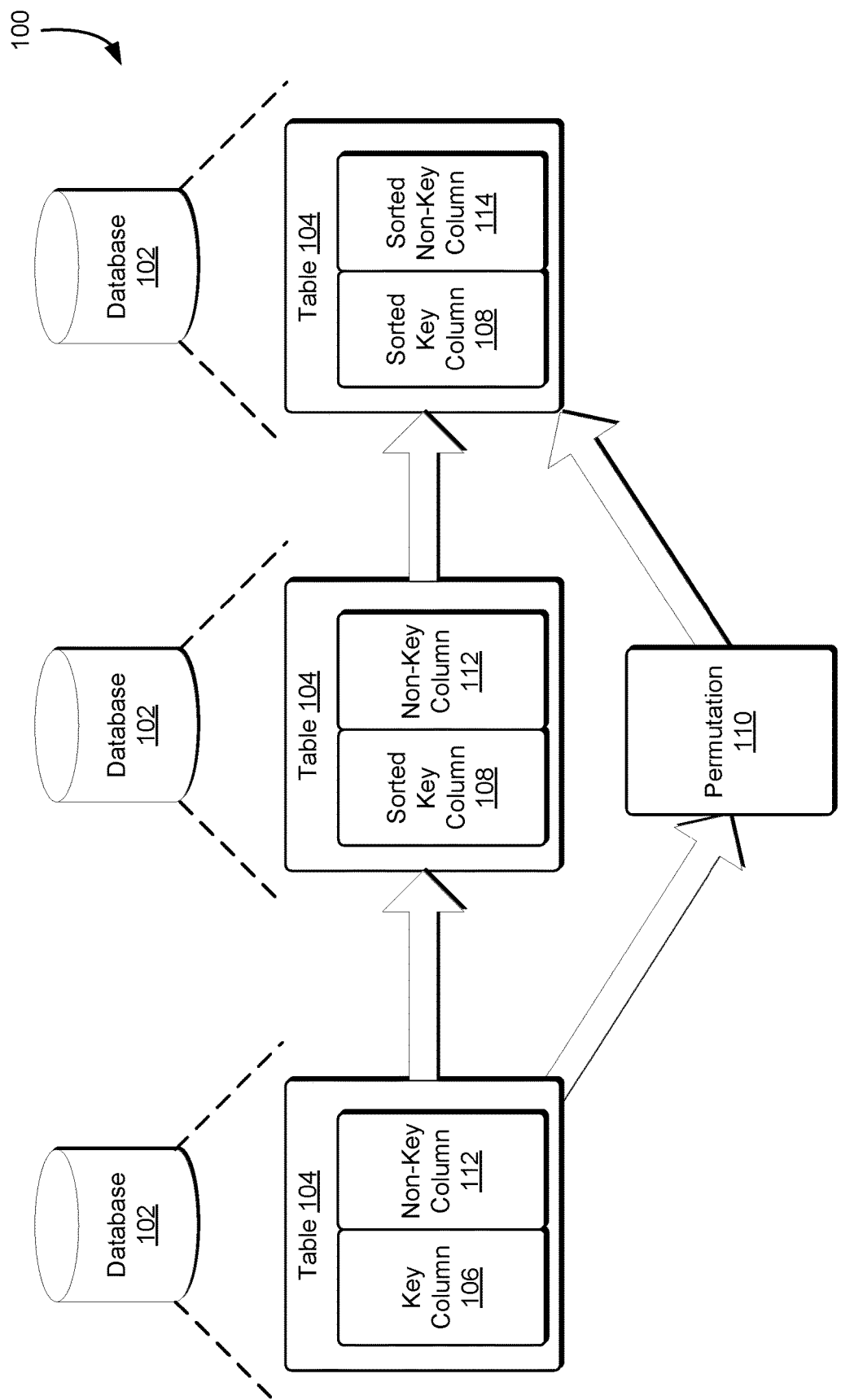
FIG. 1 illustrates a diagram of database using permutations to impose a correct sorted order on a non-key column of a database, in accordance with one embodiment.

FIG. 1 illustrates a diagram 100 in which a permutation or rule is utilized to sort data of a database table. In an embodiment, a database 102 stores data that is organized by one or more database tables 104 which store data that is organized into rows and columns. In an embodiment, the database 102 is a column-store database that does not employ sort indexes and sorts tables physically by arranging the rows in a sorted order based on the values of one or more key columns. In an embodiment, the database 102 is a relational database. In an embodiment, a database table includes at least one key column (e.g., a column that the table is, or should be, sorted on) and at least one non-key column (e.g., a column that the table is not and should not be sorted on). A database table 104, in an embodiment, has millions or even billions of rows of data—accordingly, methods of efficiently sorting such large amounts of data can vastly improve performance, decrease memory usage, improve battery life, and otherwise improve the efficiency and allocation of computing resources. In an embodiment, the database is implemented as a service in a computing resource service provider, and improvements to sorting and ordering technologies enable the computing resource service provider to utilize resources for other services that otherwise would have been utilized by the database. It should be noted that a database can, in an embodiment, have multiple tables that each employ sorting and ordering techniques such as those described herein.

In an embodiment, a database table is organized to have multiple columns of data and rows that store values for some or all of the multiple columns. In an embodiment, data of a database table can be sorted based on various sort criteria.

Data can be sorted, in an embodiment, using any suitable sort criteria, such as sorting numbers and/or text in ascending or descending order, by a custom sort criteria (e.g., prime numbers before composite numbers, empty strings first or last). In an embodiment, a sort criteria defines an ordering for different data types (e.g., a column that includes both numeric and alphabetical entries can sort the numeric values first, sort the numeric values last, sort the numeric values based on a transposition of the alphabetical string that corresponds to the number—for example, the number 10 is sorted as if it were equivalent to the text "ten"), and more. In an embodiment, each table entry (e.g., row of a database) has values associated with some or all columns of a database table. In an embodiment, a column has a data type such that each entry in the column is of the same data type. For example, a database column for an address book may include a column associated with the name of a person or business with a string data type, a column for the area code of a phone number that is a numeric data type (e.g., integer or short integer data type), a column for the seven-digit local number that is a numeric data type, and an email address as a string type. In an embodiment, some database entry values can encode an empty value and/or null value for some or all fields. In an embodiment, for purposes of sorting, the empty and/or null values can be configured to have the maximum possible value (e.g., appear first in a descending list), a minimum value (e.g., appear last in a descending list), or any other predefined values (e.g., appear between strings having an uppercase initial letter and lowercase initial letter).

In an embodiment, a database column has an associated datatype and all rows of the database column are of the same data type and the data of the column is compressed using any suitable compression algorithm and stored in a compressed format. In an embodiment, a client of a database system specifies a compression type by submitting a web API request with an encoding format. In an embodiment, an encoding type is supported when a column has a particular associated data type—for example, text encoding supported for all character-based data types (e.g., VARCHAR data type), Lempel-Ziv-Oberhumer (LZO) encoding is supported for all data types except Boolean variables, floating point variables (e.g., REAL and DOUBLE data types), run-length encoding is supported for all data types, and more. In an embodiment, a client selects a specific compression algorithm as a recommended compression algorithm for a particular column, and the compression and decompression of the column is handled transparently by the database such that client queries are not affected by the compression state of the database (e.g., the column will be automatically decompressed to retrieve data in response to a query). In an embodiment, a client uses web API requests to perform an operation on a column of a database table (e.g., writes a value of the column), compresses the database table in an encoding format, stores the database in the compressed format, decompresses the database table at a later point in time, and performs additional operations on the decompressed column (e.g., retrieve the written value from the column).

In an embodiment, a database column is stored or persisted in an encrypted format—for example, a column of a database is stored on a hard disk drive in an encrypted format while it is not in use, is decrypted in response request from a database management system to open the table, and is loaded by the database management system into secure memory (e.g., a private region of memory that is encrypted or otherwise made inaccessible to processes other than the database management system). In an embodiment, an encrypted database column or a portion thereof is decrypted as part of imposing a sorted order on the column. In an embodiment, the column is a non-key column or a permutation column. In an embodiment, a column or portion thereof can be encrypted and/or compressed—for example, a column or portion thereof is compressed using a suitable compression algorithm and then encrypted using a suitable encryption algorithm.

In an embodiment, the database table 104 is sorted on the value of one or more columns. As an example, referencing the example address book above, the "Address Book" table is, in an embodiment, sorted on the name field such that it is sorted alphabetically in ascending order such as in the following manner:

| Name | Area Code | Local Number | Email |
| --- | --- | --- | --- |
| Alex Alvarez | 206 | 321-4567 | alexa@mail.com |
| Bank of Blefuscu | 206 | 425-1609 | (empty) |
| Callum Call | 206 | 555-5555 | callumcall@mail.com |
| Jenny Jones | 206 | 867-5432 | jennyj@mail.com |
| Zachary Zarutskie | 206 | 987-5501 | zackz@mail.com |

In this example, the database table has four columns and five rows and is sorted in ascending alphabetical order based on the name column. A key column refers to a column that is used as part of sorting the database table, and a non-key column refers to a column that is not used to sort the data of the database table. In this example, the "Name" column is a key column and the area code, local number, and email columns are non-key columns. In an embodiment, a table is sorted on multiple key columns in sequence—for example, if two rows have the same value for the primary key column, then the ordering of the rows is resolved by comparing the values in the secondary key column and so on until an order is determinable. In an embodiment, if all key column values are the same, an ordering is imposed (e.g., based on a unique row id value) or is unstable (e.g., the order in which two rows having the same key value/values appears is not guaranteed by performing a sort). FIG. 1 illustrates an embodiment in which a database table 104 has one or more key columns and one or more non-key columns.

In an embodiment, a database table 104 has a key column 106 that is not in a correct sorted state, meaning that the values of the key column are not in a sorted order or are sorted using a sort criteria that is different from a desired sort criteria. In an embodiment, a database table 104 is not sorted on a column at a first point in time, and then at a later point in time, a command is issued to sort the database table 104 on the key column, generate a permutation 110 that is usable to sort the table, and various other types of requests. In an embodiment, an application programming interface (API) such as a web API received via a computing resource service provider is received and various actions are performed on the database table, such as sorting one or more columns of the database (e.g., one or more key columns) generating a permutation usable to impose correct sorted order on a non-key column without sorting the table, and/or combinations thereof.

In an embodiment, the key column 106 is sorted using any suitable sorting algorithm, including but not limited to the following sort algorithms: quicksort, heapsort, mergesort, bubble sort, insertion sort, selection sort, and radix sort. In an embodiment, sorting a column involves reading the value of the column at a first row and comparing it to the value of the column at a second row, and determining how to re-order the rows in accordance to the sort algorithm used. In an embodiment, a sort algorithm having an O(n log n) sort complexity is utilized to sort the key column 106, thereby generating a sorted key column 108. In an embodiment, the sort complexity refers to the average computational cost or the worst-case computational cost of performing the sorting algorithm—for example, a heapsort algorithm and a quicksort algorithm both have an average computational cost of O(n log n), but quicksort has a worst-case computational cost of $O(n^2)$ whereas heapsort has a worst-case computation cost of O(n log n). In an embodiment, all or less than all of a plurality of key columns are sorted in response to a request to sort the database table 104. In an embodiment, a subset of the columns of a database table 104 are sorted—for example, in response to an API request, a database management system sorts the key column 106, generates a permutation 110, and does not sort the non-key column 112.

In an embodiment, a permutation 110 refers to data that encodes a representation for how to impose a correct sorted order corresponding to a sorting algorithm on any subset of unsorted columns without the use of the sorting algorithm. In other words, in an embodiment, a permutation 110 corresponding to a sorting algorithm encodes a way of rearranging (without the sorting algorithm) a set of items to be in the same order as if the sorting algorithm was used to perform the rearrangement. A permutation, in an embodiment, relates to the rearrangement of the ordering or sequence of a set of data—for example, a permutation column, in an embodiment, includes location information that is usable to determine how to rearrange an unsorted column of data to impose a particular sorted order (ascending/descending order, case sensitive/case insensitive, and so on) on the data column. In an embodiment, a permutation is represented as a product of cycles. It should be noted that in some cases, the rearrangement of data refers to the identity rearrangement in which the ordering or sequence of data before and after applying a permutation is the same. In an embodiment, a permutation is stored separately from the database table 104, such as in the form of another database table (e.g., a mapping table), as an in-memory data structure (e.g., an array, a vector, a linked list, and more), as a binary stream of data (e.g., in a data file) and/or combinations thereof. In an embodiment, a permutation is durably stored. In this context, durability refers to, in an embodiment, assurances of durability in accordance with database principles relating to ACID properties (i.e., properties of atomicity, consistency, isolation, and durability). In an embodiment, data is durably stored when it is flushed to disk. It should be noted that, in an embodiment, durability does not provide assurances that data is absolutely durable—for example, data that is flushed to a non-volatile disk is, in an embodiment, considered to be durably stored even in cases where the non-volatile disk is susceptible to logical corruption (e.g., data is stored in a manner which is unreadable by a file system managing the disk), physical corruption (e.g., erasure of a physical storage medium due to electromagnetic forces), physical destruction (e.g., due to a fire or other catastrophic event that renders the physical storage device unusable), and more.

In an embodiment, the permutation 110 is generated as part of and/or after sorting one or more key columns (e.g., key column 106). In an embodiment, a database management system provides instructions to: generate an array of tuples having two values for each row of a database—the first value of the tuple being set to the key column value of the row and the second value of the tuple referencing the location of the row—for example, an index value (e.g., the for the first row in the table, the second value is 0 in a zero-based indexing scheme); sort the tuples in the array based on the first tuple value; replace the values of the key column with the first tuple values; append a new column in the table to store the permutation; and store the second tuple values in the permutation column. An example process for generating permutations, in an embodiment, is described elsewhere, such as processes described in connection with FIG. 6.

In an embodiment, sorting by permutation is a technique that utilizes rules such as permutations to impose correct sorted order on columns of a table without the use of a sorting algorithm such as quicksort, heapsort, and mergesort. In an embodiment, sorting by permutation is well-suited to wide tables in a column-store database by supporting just-in-time sorting of non-key columns. In an embodiment, non-key columns are sorted separately (e.g., asynchronously) from key columns. In an embodiment, the database 102 sits on top of a multi-level storage hierarchy and sorting by permutation allows for the sorting of hot and cold columns separately—in an embodiment, a "hot" column refers to a columns that is accessed frequently, require fast access times, is stored in a high bandwidth and/or low latency storage device such as a hard disk drive, a solid state storage device, and more; in an embodiment, a "cold" column refers to a column that is access infrequently (e.g., the data, in some cases, is not accessed for months or years) and is stored on a slower, less-costly medium such as a tape drive of a storage service. Generally speaking, hot columns are stored in faster and/or more efficient storage media as compared to cold columns.

In an embodiment, a rule such as a permutation, once computed, allows a system to impose correct sorted order on a subset of columns of a table using memory and time linearly proportional to the volume of data to be sorted (i.e., O(n) time complexity to sort the subset of columns). In an embodiment, sorting by permutation allows columns to be sorted in-place and can utilize a variety of efficient parallel and distributed implementations. In an embodiment, sorting by permutation facilitates sorting of columns in memory-constrained situations favorable to those offered by alternative implementations that utilize a row-wise mergesort.

In an embodiment, values of a key column 106 are sorted using any suitable sorting algorithm (e.g., quicksort) according to a sort criteria to produce a sorted key column 108 but at least one non-key column 112 remains unsorted and a rule (e.g., a permutation 110 encoded as a column of the table) is generated wherein each value of the rule describes where the entries of the non-key column should be placed to impose sorted order on the non-key column. In an embodiment, the rule stores indices that indicate the row index of where the value of the non-key column should be placed. In an embodiment, the rule encodes handles that can be used to seek to the position of a table where the non-key column value should be placed to impose a sorted order. In an embodiment, a permutation is the rule.

In an embodiment, sorting by permutation uses the rule (e.g., the permutation 110 shown in FIG. 1) to impose a correct sorted order on an unsorted column such as the non-key column 112 illustrated in FIG. 1. In an embodiment, sorting by permutation is implemented using an out-of-place sort which: allocates resources (e.g., memory and/or storage) for a destination column which is accessed randomly, but the unsorted column and permutation column are accessed sequentially. A process for performing an out-of-place sort is implemented, in an embodiment, in accordance with the process described elsewhere in connection with FIG. 7. In an embodiment, sorting by permutation is implemented using an in-place sort which avoids the need to separately allocate resources for a destination array or destination column. A process for performing an in-place sort is implemented, in an embodiment, in accordance with the process described elsewhere in connection with FIG. 8. In an embodiment, sorting by permutation (e.g., implemented as an out-of-place sort or an in-place sort) generates a sorted non-key column 114 from an unsorted non-key column 112.

In an embodiment, techniques described elsewhere in connection with FIG. 1 to impose correct sorted order on database table columns can be applied to imposing correct sorted order on a two-dimensional array (or higher dimensional arrays), a matrix, a spreadsheet, and other forms of data that are representable as rows and columns of data. In an embodiment, there is a bijective relationship between the elements (also referred to as members) of a permutation and a column (e.g., a key column and/or a non-key column). In an embodiment, the relationship between a permutation and a column of sorted and/or unsorted data is not a bijective relationship but, instead, is either an injective relationship or a surjective relationship. For example, in an embodiment where there is a surjective relationship (i.e., a surjective relationship but not a bijective relationship) between a permutation and a data column, row values can be combined, such as in the case where there is duplicate data in multiple rows of the data column. As a second example, an embodiment is implemented in which there is an injective relationship (i.e., an injective relationship but not a bijective relationship) between a permutation and a data column such that there are additional entries included in the data column for future entries—generation of a data column in this manner can allow for later insertions of sorted data more efficiently and require less frequent re-sorting of the data column because newly added entries can be inserted into empty entries within the data column rather than only being appended (or prepended).

Figure 2:
FIG. 2 illustrates a diagram of a permutation column being generated, in accordance with one embodiment.

FIG. 2 illustrates a diagram 200 in which a permutation is created. In an embodiment, the database table is in accordance with those described elsewhere in connection with FIG. 1. In an embodiment, a key column K of the database table is sorted using any suitable sorting algorithm (e.g., quicksort) without sorting other columns (e.g., a non-key column C) and a permutation column P is calculated that includes elements (also referred to as entries, members, associations, values, and mappings) describes where the entries of the unsorted non-key column C should be placed to impose sorted order on the non-key column C. A system such as the system described elsewhere in connection with FIG. 1, in an embodiment, implements the techniques described in connection with FIG. 2.

In an embodiment, a database table is in a first state 202A where one or more key columns such as key column K shown in FIG. 2 are not sorted or are sorted based on an incorrect criteria (e.g., the sort order may have changed from ascending to descending, or the columns on which to sort on have been changed). In an embodiment, the database table includes one or more key columns that the sort order is determined based on and further includes one or more non-key columns. For example, FIG. 2 illustrates a database table in a first state 202A having ten rows and two columns—a key column K which is to be sorted, and a non-key column which is not used to sort the rows of the database table. It should be noted that the indices shown in brackets are illustrated for clarity and are not necessarily encoded in the database.—for example, the first row (e.g., the zero-th entry) of the database table illustrated in FIG. 2 has a key value of "5" (e.g., encoded as an integer data type) and a non-key value of "E" (e.g., encoded as a string or character, possibly with a null terminator indicating the end of a string).

In an embodiment, a component such as a database management system sorts the key column using any suitable sorting algorithm (e.g., quicksort) and generates a permutation column P as part of a process that transforms the state of the database from the first state 202A to a second state 202B. In an embodiment, a database management system is software, hardware, or a combination thereof. In an embodiment, a database management system includes executable code that, if executed on one or more processors, causes the one or more processors to sort one or more key columns without sorting one or more non-key columns and generates a permutation column P that can be utilized to impose a sorted order on unsorted columns (e.g., the one or more non-key columns that were not sorted when the key columns were sorted) without applying a sorting algorithm (e.g., quicksort, mergesort, heap sort) to the unsorted columns.

In an embodiment, the key column K is sorted using any suitable sorting algorithm such as quicksort so that the values of the key column in the initial state 202A are sorted to produce a second state 202B where the values of the key column are sorted in accordance to a sort criteria—for example, FIG. 2 illustrates an example where the key column is sorted in ascending order. In an embodiment, the database table is a column-store database where each column is stored in contiguous blocks of storage—for example, a column or a contiguous portion thereof is stored in a first storage device and a second column or a contiguous portion thereof is stored in a second storage device. In an embodiment, a permutation column P is generated in the table as part of sorting the key column. In an embodiment, the table is in the first state 202A and a database management system generates a vector v with size equal to the number of rows in the table (or portion thereof) to be sorted wherein the vector is a vector of a tuple having two values: k, a key index, and u, an unsorted row index. In an embodiment, the tuple is implemented as a C-style structure having two integers k and u. In an embodiment, the vector v is initialized with the values of the unsorted key column and the corresponding row indexes:

| v.k | v.u |
|-----|-----|
| 5 | 0 |
| 2 | 1 |
| 7 | 2 |
| 1 | 3 |
| 3 | 4 |
| 1 | 5 |
| 9 | 6 |
| 9 | 7 |
| 4 | 8 |
| 1 | 9 |

In an embodiment, u stores the unsorted row index; in an embodiment, u stores address information corresponding to the row at the index such as a database handle.

In an embodiment, the vector v is sorted using any suitable sorting algorithm (e.g., quicksort) based on the values of v.k which produces, in an embodiment, the following structure:

| v.k | v.u |
|-----|-----|
| 1 | 9 |
| 1 | 3 |
| 1 | 5 |
| 2 | 1 |
| 3 | 4 |
| 4 | 8 |
| 5 | 0 |
| 7 | 2 |
| 9 | 6 |
| 9 | 7 |

In an embodiment, the key column values are replaced by the values of v.k in order—for example, the key column value for the first, second, and third rows (i.e., the rows at the 0-th, 1-st, and 2-nd indices) is set to 1, the key value for the fourth row is set to 2, and so on. In an embodiment, the permutation value at the index of v.u is set equal to the value of the corresponding index. Continuing with the example above (and using a zero-based numbering scheme), the 9-th index of the permutation column is set to a value of 0, the 3-rd index of the permutation column is set to a value 1, the 5-th index of the permutation column is set to 2, and so on. Thus, in an embodiment, the permutation column is generated in the manner described above to produce the results illustrated in the second state 202B of the table. It should be further noted that the data of the non-key column C has not been altered from the first state 202A to the second state 202B. In an embodiment, the database table is a column-store database wherein the non-key column C is stored in cold storage (e.g., a tape drive) and is not accessed as part of sorting the key-column K and generating the permutation column C.

FIG. 3 illustrates a diagram 300 in which a permutation is used to impose a sorted order on a non-key column. In an embodiment, the database table is in accordance with those described elsewhere in connection with FIGS. 1 and 2. In an embodiment the database table is in a first state 302A that is generated as a result of sorting a key column and generating a permutation column, such as in the manner described elsewhere in connection with FIG. 2. A system such as the system described elsewhere in connection with FIG. 1, in an embodiment, implements the techniques described in connection with FIG. 3.

In an embodiment, a database has one or more key columns that are used as part of a sort criterion. FIG. 3 illustrates an embodiment in which a table has one key column, although in other embodiments, multiple key columns can exist and a sort order can be defined such that if a primary key column value for two rows is equal, a secondary key column value for the two rows is used to resolve the ordering, and a tertiary column value if those values are equal as well, and so on. In an embodiment, the values of the key column K are sorted using any suitable sorting algorithm (e.g., quicksort) and the permutation column P generated in accordance with techniques discussed elsewhere in connection with FIG. 2. In an embodiment, a database table that is in the first state 302A having a key column K that is sorted, a permutation column generated either as part of or using the sorted key column K, and one or more unsorted columns (e.g., an unsorted non-key column C as illustrated in FIG. 3) can utilize various techniques to impose a correct sorted order on the one or more unsorted columns in linear time and memory without the use of a sorting algorithm.

In an embodiment, the permutation column P is utilized to impose a correct sorted order on one or more columns of the table. In an embodiment, the permutation column P stores indices that indicate the row index in the correct sorted order where the value of the non-key column in the un-sorted order should be placed. In an embodiment, the permutation column P encodes a handle that can be used to seek to the position of the table where the non-key column value should be placed to impose a sorted order. In an embodiment (e.g., embodiments implemented in accordance with a two-dimensional matrix having rows and columns of data), the permutation encodes a pointer to the memory address where the non-key column value should be placed to impose a sorted order. For example, in an embodiment in accordance with FIG. 3, the permutation column encodes the index value of where the non-key column C value should be placed to impose a sorted order. Continuing with the example, examining the first row of the table in the first state 302A indicates that the value of the non-key column in the first row (i.e., the value "E") belongs in the 6-th index in the non-key column if a sorted order is imposed on the column. Accordingly, in an embodiment, a system iterates through each row of the table to determine how to impose a sorted order on the non-key column C and the database table results in a second state 302B where the non-key column values are placed in their correct location according to the sort order. In an embodiment, the sort order is imposed on the non-key column C using an out-of-place sort algorithm in accordance with the process described in connection with FIG. 7; in an embodiment, the sort order is imposed on the non-key column C using an in-place sort algorithm in accordance with the process described in FIG. 8.

Figure 4:
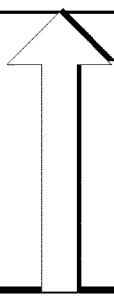
FIG. 4 illustrates a diagram of a sorted order being imposed on a column, in accordance with one embodiment.

FIG. 4 illustrates a diagram 400 in which a permutation is used to impose a sorted order on a non-key column. In an embodiment, the database table is in accordance with those described elsewhere in connection with FIGS. 1 and 2. In an embodiment the database table is in a first state 402A that is generated as a result of sorting a key column and generating a permutation column, such as in the manner described elsewhere in connection with FIG. 2. A system such as the system described elsewhere in connection with FIG. 1, in an embodiment, implements the techniques described in connection with FIG. 4.

In an embodiment, a database table is in a first state 402A in which one or more key columns which are used to define a sort order are in a correct sorted order and a permutation column P has been generated which encodes how the entries of an unsorted column (e.g., a non-key column C) should be placed to impose a sorted order. In an embodiment, a system such as those used to implement the system described in FIG. 1 uses the (unsorted) non-key column C and the permutation column P to generate a sorted non-key column C_sorted which reflects order in which the values in the non-key column should be placed if sorted in accordance with the sort order that was used to sort the key column K.

In an embodiment, a system such as a database management system uses the unsorted column C and the permutation column P to generate the sorted column C_sorted in a second state 402B. In an embodiment, the permutation value for a row indicates where the value of the row's non-sorted column belongs in the sorted column C_sorted—for example, FIG. 4 illustrates that for the first row, the value of the non-sorted column "E" belongs in the 6-th index of C_sorted (i.e., the seventh entry of C_sorted in a zero-based numbering scheme). This process can be repeated for each row to fill in each value of the C_sorted column. In an embodiment, the database table is implemented as a column-store database wherein each column of data is stored contiguously in separate data containers (e.g., separate storage drives). In an embodiment, a system initializes a new storage container for the C_sorted column, asynchronously generates the values of the C_sorted column by reading the values of the unsorted column C and the permutation column P, and after completely filling in the C_sorted column, replaces the unsorted column C with the sorted column C_sorted. In an embodiment, advantages of this technique include at least that only read access to the unsorted column C and the sorted column P are needed while the sorted column C_sorted is being built. In an embodiment, the column C_sorted can be built asynchronously in a background process that runs at a reduced priority as compared to requests to read and write data to the database table.

In an embodiment, an array, vector, matrix, spreadsheet, or other data encoding formats that are represented as rows and columns are implemented in accordance with techniques described above in connection with FIGS. 2-4. For example, a first index of a two-dimensional matrix is treated as rows of the matrix and a second index of the matrix is treated as columns of the matrix. In an embodiment, a two-dimensional array of data (e.g., integers) is implemented such that a subset of data along one dimension is sorted and a permutation is generated that is used to impose a sorted order on other data along the same dimension. In an embodiment, a spreadsheet is sorted in accordance with techniques described in accordance with FIGS. 2-4 wherein unsorted non-key columns are delay-loaded into the spreadsheet and sorting of the non-key columns are deferred until needed—for example, in response to a request to access data in a non-key column. In an embodiment, a matrix is encoded in a shared memory (e.g., memory that can be simultaneously accessed by multiple applications and/or process spaces) and correct sorted order is imposed on the non-key columns in accordance with techniques described in connection FIG. 4 such that a sorting algorithm (e.g., quicksort) need not be applied to the non-key columns—in an embodiment, the techniques disclosed in connection with FIG. 4 read data from an unsorted non-key column of the matrix and a permutation column of the matrix and generates a sorted non-key column in a separate memory space from the unsorted non-key column. In an embodiment, the system that manages the shared memory obtains a synchronization primitive such as a mutex or semaphore and overwrites data of the memory of the unsorted non-key column with the data of the memory of the sorted non-key column—this embodiment has various advantages over other implementations, such as holding the mutex for only a short duration to copy the memory contents and not needing to hold the mutex to build the sorted non-key column. In an embodiment, various types of data formats can be utilized in conjunction with each other. In an embodiment, a database having key columns and non-key columns generates permutations and stores the permutations in short-term memory (e.g., RAM) using any suitable data structure, such as an in-memory array.

Figure 5:
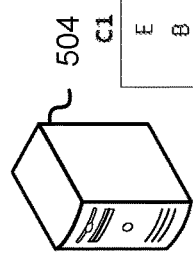
FIG. 5 illustrates a diagram of a parallelized system for imposing a sorted order on multiple columns, in accordance with one embodiment.
Figure 5:
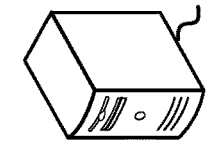

FIG. 5 illustrates a diagram 500 where a system, in an embodiment, sorts multiple non-key columns in a parallelized manner. In an embodiment, storage of database tables of a database is organized by column—that is, a column or portion thereof is stored in contiguous blocks of one or more storage media. In an embodiment, a first column of the database table illustrated in FIG. 5 is stored contiguously on a first plurality of storage devices and a second column of the database table is stored contiguously on a second plurality of storage devices, and so on.

In an embodiment, a database table 502 includes one or more sort columns such as sort column K illustrated in FIG. 5 and one or more non-sort columns such as non-sort columns C1 and C2 illustrated in FIG. 5. In an embodiment, a permutation column is generated using techniques described elsewhere, such as in connection with FIGS. 1 and 6. It should be noted that, in an embodiment, the permutation column is a column of the same database table that it is derived from, but such need not be the case—for example, a separate database table for permutations exists, in an embodiment, and a mapping table is utilized to bind a column of the permutation table to the database table it is derived from.

In an embodiment, a first computing system 504 is a compute instance (e.g., virtual machine instance) of a computing resource service provider that is configured with executable code that, if executed by one or more processors, causes the one or more processor to obtain a subset of the unsorted columns (e.g., the first unsorted non-key column C1); obtain the permutation column; and use the permutation to impose a correct sorted order on the subset of unsorted columns, thereby generating a subset of sorted columns.

In an embodiment, a second computing system 506 is a computing instance (e.g., virtual machine instance) that runs separate from the first computing system 504 and computing systems are able to execute code concurrently. In an embodiment, the second computing system 506 is configured with executable code that, if executed by one or more processors, causes the one or more processors to obtains a second subset of the unsorted columns (e.g., the second unsorted non-key column C2); obtain the permutation column, and use the permutation to impose a correct sorted order on the second subset of the unsorted columns, thereby generating a second subset of sorted columns. It should be noted that the first computing system 504 and the second computing system, in an embodiment, run concurrently, thereby effectively doubling the speed at which columns are sorted (e.g., as compared to a single computing system serially sorting each unsorted non-key column). In an embodiment, the sorting is parallelized to a plurality of workers (e.g., worker threads) that each select one or more unsorted columns, the permutation column, and perform a sort on the selected columns.

Figure 6:
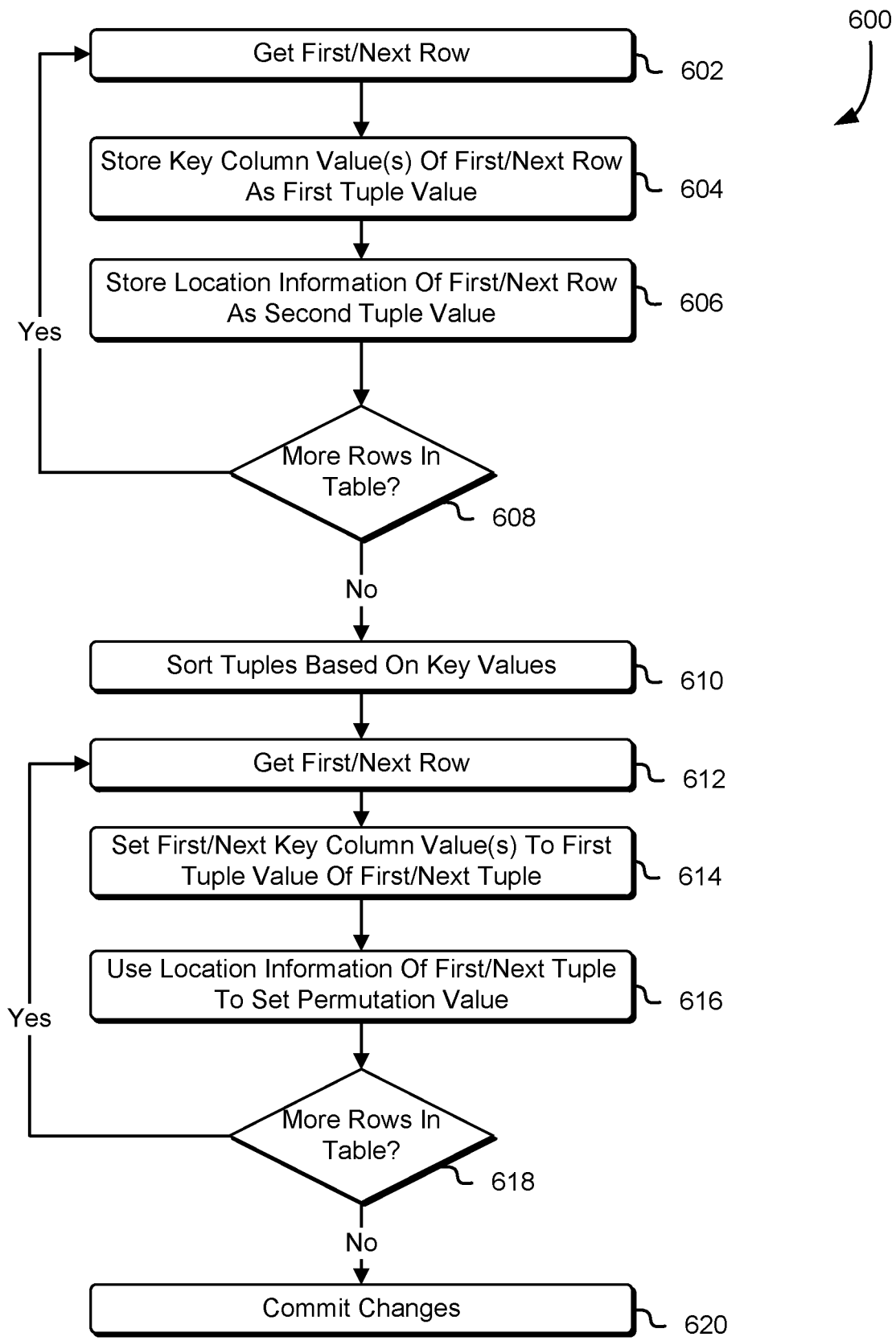
FIG. 6 illustrates process for generating permutations that are usable to impose a sorted order on data stored in one or more columns, in accordance with one embodiment.

FIG. 6 shows an illustrative example of a process that, as a result of being performed by a suitable system, generates permutations that are usable to impose a sorted order on data stored in one or more columns. The process illustrated in the flowchart 600 may, generally speaking, be performed by any suitable computing entity such as by a database management system, an operating system, software applications, and more. In an embodiment, the process is performed in the context of sorting a database table having one or more key columns that define a sort criteria, although the techniques described in connection with FIG. 6 can also be utilized in connection with sorting data organized in a variety of structures that are readily described in a row-column paradigm, such as two-dimensional vectors, spreadsheets, and more. For example, in an embodiment that sorts a database table, a permutation column is created; in an embodiment that sorts a matrix of integers, an array or vector of integers is instantiated (e.g., by allocating memory).

In an embodiment, a database management system includes executable code that, if executed by one or more processors, causes the one or more processors to get 602 a first row of a database table, such as by enumerating a database table and moving a database cursor to the first row of the table. In an embodiment, the system reads the values stored in one or more key columns of the first row and stores 604 the value, in an embodiment, as the first value of a tuple at the first index of an array of tuples. In an embodiment, the system obtains location information associated with the first database row—such as an index of the row in the database— and stores 606 the location information of the first row as the second value of a tuple at the first index of an array of tuples. In an embodiment, the location information is encoded as an index such that an index value of i indicates that the row is the i-th row of the database (e.g., encoded in a zero-based or one-based numbering scheme). In an embodiment, the location information is any information that can be dereferenced to access the first row, such as a database handle or reference pointer.

In an embodiment, the system determines whether 608 there are additional rows of the table to enumerate. In an embodiment, a database cursor is utilized to iteratively walk rows of the table. In an embodiment, additional rows are detected, and the steps 602-606 described above are repeated for the next row of the database table—for example, the system obtains a second row, reads the values stored in one or more key columns of the second row, stores the value or values as the first value of the second tuple of an array of tuples, and stores location information (e.g., an index) as the second value of the second tuple. In an embodiment, the system enumerates the entire database table; in an embodiment, the system enumerates a contiguous subset of rows of the database table.

In an embodiment, the system determines that no more rows of the database table to enumerate and sorts 610 the array of tuples based on the key values stored as the first tuples of the array. The sort 610, in an embodiment, can be performed using any suitable sort criteria, such as by sorting in ascending or descending order, by a custom sort criteria (e.g., prime numbers before composite numbers, empty strings first or last), and can even utilize custom sort criteria that order different data types (e.g., a column that includes both numeric and alphabetical entries can sort the numeric values first, sort the numeric values last, sort the numeric values based on a transposition of the alphabetical string that corresponds to the number—for example, the number 10 is sorted as if it were equivalent to the text "ten"). In an embodiment, the tuple is a structure that has a first value that includes the values of one or more key columns and a second tuple that encodes location information as described above. For example, a tuple, in an embodiment, is defined by the following C++-style structure:

```
struct tuple
{
    vector<int> k; // array of key values for a row
    int u; // row index
};
```

In an embodiment, the vector described in the example above is implemented in accordance with a C++ Standard Template Library (STL) vector. In an embodiment, the array of tuples is sorted based on the first tuple value (e.g., sorted based on the values of k in the example structure above) and any suitable comparison function can be defined to compare tuple values. In an embodiment, an O(n log n) sort such as quicksort is utilized to sort the array of tuples. It should be noted that while an embodiment in accordance with FIG. 6 sorts the array of tuples based on the key value, that performing a sort of the array is not always necessary—for example, in an embodiment, a system does not sort a column and generates a permutation for that column, re-orders the column at a later point in time, and then, after re-ordering the column, uses the permutation to re-establish the original unsorted order.

In an embodiment, after or concurrent with the sorting step, the system gets 612 the first row of the table. In an embodiment, the system re-enumerates the rows that were enumerated in connection with steps 602-608. In an embodiment, the system seeks to the first row of the database table and sets 614 the values for one or more key columns to the corresponding values of the first tuple value of the first tuple of the sorted array of tuples. In an embodiment, the system uses 616 location information stored in the second tuple value of the first tuple of the sorted array of tuples to set the permutation value by accessing the row referenced by the location information and setting the permutation value of that row to location information of the first row (e.g., the index of the first row).

In an embodiment, the system determines whether 618 there are additional rows of the table to enumerate. In an embodiment, a database cursor is utilized to iteratively walk rows of the table by obtaining a database cursor, setting the cursor to the first row of the table (e.g., by seeking to the beginning of the table), iteratively moving the database cursor from the current row to the next row of the table (e.g., by seeking from the first row of the table to the second row of the table, from the second row to the third row, and so on). In an embodiment, additional rows are detected, and the steps 612-616 described above are repeated for the next row of the database table—for example, the system obtains a second row, sets the value for one or more key columns of the second row to the corresponding values of the first tuple value of the second tuple of the sorted array of tuples, and uses the location information stored in the second tuple of the second tuple of the sorted array to set the permutation value by accessing the row referenced by the location information and setting the permutation value of that row to location information of the second row (e.g., the index of the second row). In an embodiment, the system enumerates the entire database table; in an embodiment, the system enumerates a contiguous subset of rows of the database table. If there are no more rows to enumerate, the process, in an embodiment, is completed and permutations for each of the enumerated rows of the table are committed 620, such as by flushing the changes to disk, flushing log entries associated with the changes to disk, committing a transaction, and more.

In an embodiment, techniques for the process described in connection with FIG. 6 can be implemented in the context of a database system, but can also be utilized in the context of a two-dimensional array (or higher dimensional arrays), a matrix, a spreadsheet, and other forms of data that are representable as rows and columns of data. In an embodiment, an implementation for generating permutation arrays is described below in C-style source code:

```
struct table
{
    int R, /* number of rows */
    *K, /* key column */
    *C, /* non-key column */
    *P, /* permutation column */
};
struct tuple
{
    int k, /* key */
    u; /* unsorted row */
};
static int tmp_cmp(const void *p, const void *q)
```

```
{
    const struct tmp *a=(const struct tuple *)p,
        *b=(const struct tuple *)q;
    return a→k<b→k ? -1: (a→k>b→k ? 1 : 0);
}
static void generate_permutation(struct table *T)
{
    tuple *tmp=(struct tuple *)Calloc(T→R, sizeof
        (*tuple));
    for (int r=0; r<T→R; r++)
    {
        tmp[r].k=T→K[r];
        tmp[r].u=r;
    }
    qsort(tmp, (size_t)T→R, sizeof (*tuple), tmp_cmp);
    T→P=(int *)Calloc(T→R, sizeof (*(T→P)));
    for (int s=0; s<T→R; s++)
    {
        T→K[s]=tmp[s].k;
        T→P[tmp[s].u]=s;
    }
}
```

It should be noted that the above example code, the qsort function invoked is, in an embodiment, a quicksort function that sorts the supplied tuple array in accordance with the tmp_cmp comparison function being the sort criteria, although any other suitable sorting function such as heapsort, mergesort, bubble sort, etc., can also be utilized. It should also be noted that, in the example code here and elsewhere, additional code, such as code surrounding verification of input parameters and verification that memory allocations succeeded, has been omitted for clarity.

Figure 7:
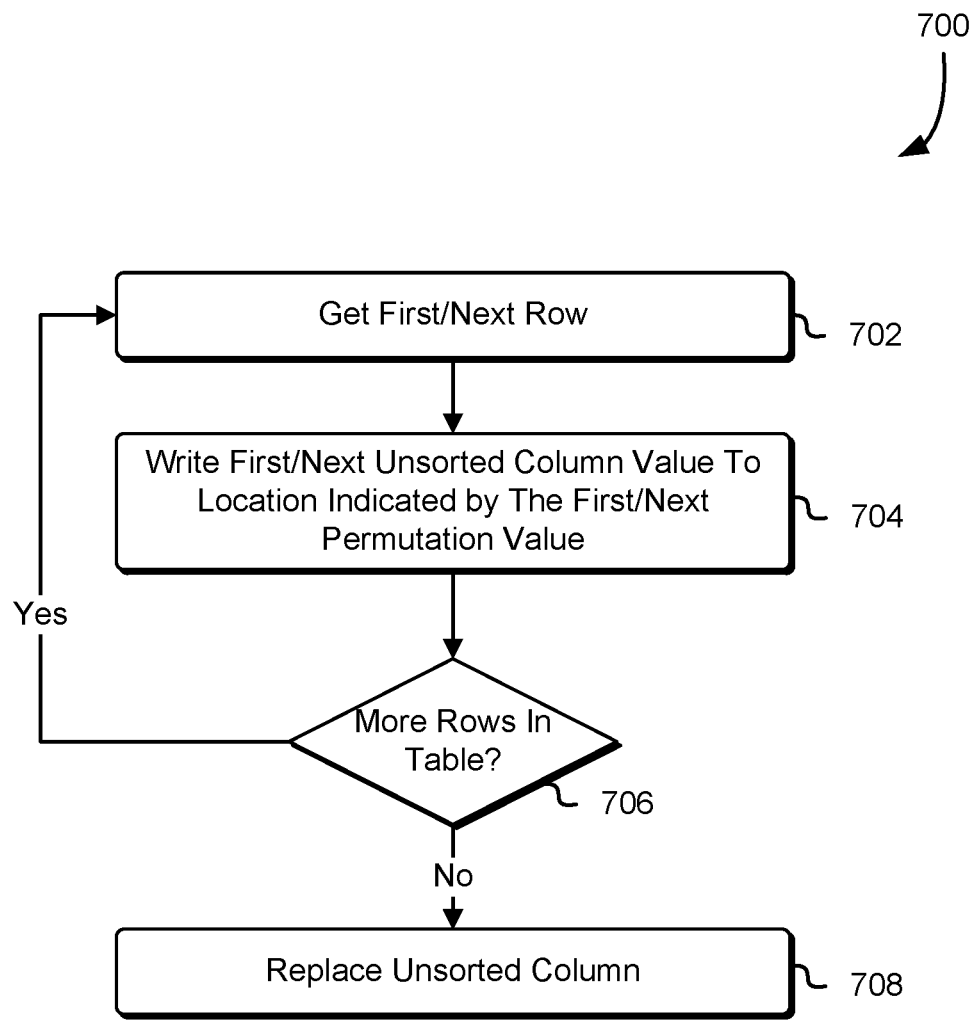
FIG. 7 illustrates process for imposing a correct sorted order using an out-of-place sorting by permutation process, in accordance with one embodiment.

FIG. 7 shows an illustrative example of a process that, as a result of being performed by a suitable system, implements an out-of-place sorting by permutation process. The process illustrated in the flowchart 700 may, generally speaking, be performed by any suitable computing entity such as by a database management system, an operating system, software applications, and more. In an embodiment, permutations utilized by the process are generated in accordance with the process described elsewhere in this disclosure, such as those described in connection with FIG. 6.

In an embodiment, a database management system includes executable code that, if executed by one or more processors, causes the one or more processors to get 702 a first row of a database table, such as by enumerating a database table and moving a database cursor to the first row of the table. In an embodiment, the system allocates memory for an array, creates a new column, or otherwise reserves additional memory and/or storage that is proportional to the number of rows in the table (or, if less than all the rows of the table are being sorted, proportional to the number of rows in which correct sorted order is being imposed upon). In an embodiment, the system reads the permutation value of the first row and also reads the values of one or more unsorted columns (e.g., non-key columns) for which a correct sorted order is to be imposed on. In an embodiment, the permutation column stores data such as location information that can be dereferenced to access a row of the database table, such as a database handle, reference pointer, an index of the row, and more. In an embodiment, the system accesses a location based at least in part on the information stored in the permutation and writes 704 the one or more unsorted column values to the location indicated by the permutation value. For example, a permutation value, in an embodiment, references an index to which an unsorted column value should be written, and the value is written to an array based on the index value, where the array is used as a staging area.

In an embodiment, the system determines whether 706 there are additional rows of the table to enumerate. In an embodiment, a database cursor is utilized to iteratively walk rows of the table. In an embodiment, additional rows are detected, and the steps 702-704 described above are repeated for the next row of the database table—for example, the system reads the permutation value of the second row and also reads the values of one or more unsorted columns (e.g., non-key columns) for which a correct sorted order is to be imposed on, accesses a location based at least in part on the information stored in the permutation, and writes the one or more unsorted column values of the second row to the location. In an embodiment, the system enumerates the entire database table; in an embodiment, the system enumerates a contiguous subset of rows of the database table.

In an embodiment, the system determines there are no more rows to enumerate and replaces 708 the unsorted column with data of a sorted column. In an embodiment, the system iteratively walks the unsorted column (e.g., non-key column) and replaces each value with the respective value in an array that was generated using the permutation values. In an embodiment, the unsorted column is replaced by a sorted column (e.g., using techniques described in connection with FIG. 4).

In an embodiment, techniques for the process described in connection with FIG. 7 can be implemented in the context of a database system, but can also be utilized in the context of a two-dimensional array (or higher dimensional arrays), a matrix, a spreadsheet, and other forms of data that are representable as rows and columns of data. In an embodiment, an implementation for out-of-place sorting by permutation is described below in C-style source code:

```
    static void sort_by_permutation_out_of_place(struct
        table *T)
    {
        int *sorted_C;
        sorted_C=(int *)Calloc(T→R, sizeof (*sorted_C));
        // use the permutation to impose a sorted order on the
            column
        // and store the results in sorted_C
        for (int r=0; r<T→R; r++)
        {
            sorted_C[T→P[r]]=T→C[r];
        }
        // replace the contents of the unsorted column
        // with the contents of the sorted column
        free(T→C);
        T→C=sorted_C;
    }
```

In an embodiment, the permutations are generated using techniques described in connection with FIG. 6.

Figure 8:
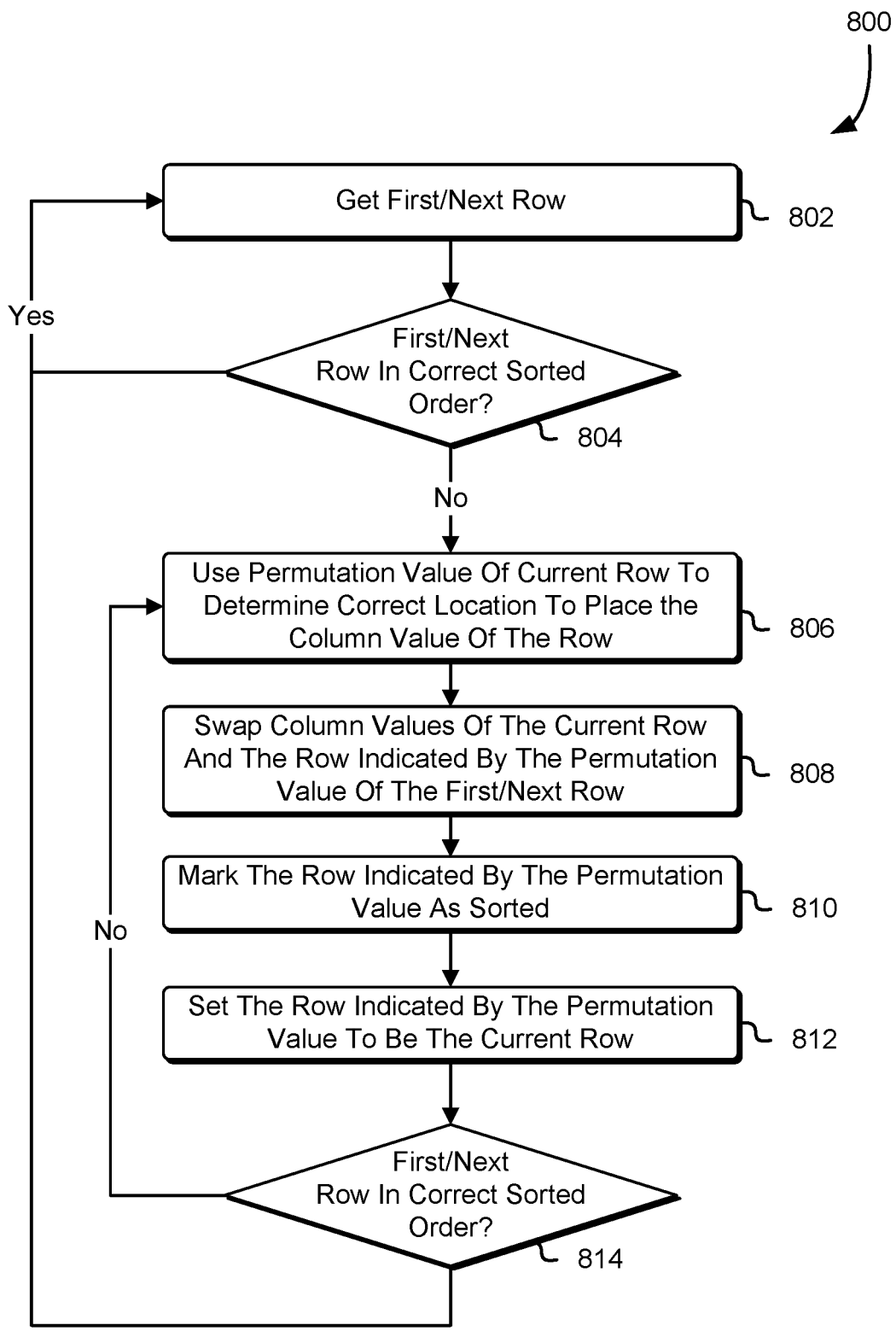
FIG. 8 illustrates process for imposing a correct sorted order using an in-place sorting by permutation process, in accordance with one embodiment.

FIG. 8 shows an illustrative example of a process that, as a result of being performed by a suitable system, implements in-place sorting by permutation. In-place sorting by permutation, in an embodiment, refers to a process for imposing a sorted order on a column without reserving additional memory and/or storage proportional to the number of entries being sorted. In other words, a process for in-place sorting by permutation, in an embodiment, lacks an allocation of memory and/or storage that proportionate to the number of rows that the in-place sort is being applied to. The process illustrated in the flowchart 800 may, generally speaking, be performed by any suitable computing entity such as by a database management system, an operating system, software applications, and more. In an embodiment, permutations utilized by the process are generated in accordance with the process described elsewhere in this disclosure, such as those described in connection with FIG. 6.

In an embodiment, a database management system includes executable code that, if executed by one or more processors, causes the one or more processors to get 802 a first row of a database table, such as by accessing a database table and moving a database cursor to the first row of the table. The system checks whether 804 the permutation of the row is marked as done. In an embodiment, the permutation values are non-negative indices and a row is marked as done with a negative value. In an embodiment, if the row is marked done, the system seeks to the next row in the table and continues enumerating the table until a row that is not marked done is detected.

If the row is not marked as done, then the system, in an embodiment, obtains the permutation value for the row and uses 806 the permutation value to determine the correct location to place the column value to place the column value in the correct location for the column in a sorted state. In an embodiment, system swaps 808 the column value of the row and the column value of the location determined from the permutation value. In an embodiment, this process is repeated using the row referenced in the corresponding permutation value until the value of the first column is in a correct sorted state. In an embodiment, the permutation column for a row that has the correct sorted value is marked 810 as done, such as by transforming the permutation value in a manner that encodes the permutation value and an indication that the row is done (e.g., appending a value, adding or subtracting a value that generates an out-of-bounds result value that is not a valid location, and more). In an embodiment, the system sets 812 the row indicated by the permutation value to be the next row for which to impose correct sorted order on, checks whether 814 correct sorted order has already been imposed on the row (e.g., by checking for an out-of-bounds permutation value), and repeating steps 806-812 if needed.

In an embodiment, the system successfully imposes correct sorted order on the first row and repeats the process for the next row in the database. In an embodiment, a database cursor is utilized to iteratively walk rows of the table. In an embodiment, additional rows are detected, and the steps 804-814 described above are repeated for the next row of the database table—for example, the system seeks to the second row of the database table, checks whether the permutation value of the second row is marked as done, if the row is not marked as done, obtains the permutation value for the second row and uses the permutation value to determine the correct location to place the value stored in the column entry of the second row to place the column value in the correct location for the column in a sorted state, and repeats placing column values in the correct locations based on permutation values until the column value of the second order is correct.

In an embodiment, a permutation is represented as a product of cycles. In an embodiment, a cycle is represented by obtaining a row (e.g., the first/next row), obtaining the corresponding permutation value of the row, and placing the un-sorted column value of the row to the location indicated by the permutation value of the row, and repeating these steps for the row that the permutation value references, and continuing until the initial row (e.g., the first/next row) has a correct sorted value for the non-key column.

In an embodiment, the permutation values are restored after the column is sorted, such as by performing an inverse operation to the operation that was used to mark the permutation value as done, such as by removing an appended value, subtracting or adding a value to an out-of-bounds value to generate the permutation value, and so on.

In an embodiment, an implementation for sorting by permutation using an in-place sort is described below in C-style source code:

```
#define CYCLE_START (-1)
#define SWAP(a,b) do {int t=(a); (a)=(b); (b)=t; } while (0)
#define IS_DONE(row) (0>T→P[(row)])
#define NOT_DONE(row) (0<=T→P[(row)] && T→R>T→P[(row)])
static void sort_by_permutation_in_place(struct table *T)
{
    for (int r=0; r<T→R; r++)
    {
        if (NOT_DONE(r))
        {
            int cur=T→P[r], tmp=T→C[r];
            T→C[r]=CYCLE_START;
            do {
                int nxt=T→P[cur];
                SWAP(tmp, T→C[cur]);
                T→P[cur]-=(T→R+1); /* mark done */
                cur=nxt;
            } while (CYCLE_START !=tmp);
        }
    }
    // restore P[ ]
    for (int s=0; s<T→R; s++)
    {
        T→P[s]+=(T→R+1);
    }
}
```

In an embodiment, in-place and out-of-place implementations of sorting by permutation offer different tradeoffs. Generally speaking, an out-of-place sorting by permutation process is simpler to implement and requires less random-access memory (RAM)—in the code example above, the newly allocated destination column sorted_C is accessed randomly, but the unsorted column C and permutation column P are accessed sequentially. An implementation, in an embodiment, streams the contents of C and P into RAM (e.g., from storage), keeping only the destination array sorted_C resident in RAM. Generally speaking, in-place implementations for sorting by permutation are more sophisticated, but avoids the need to separately allocate a destination array—in the code example above, the algorithm randomly accesses both permutation column P and the column being sorted, C. In an embodiment, a conventional computer system loads both of these columns C and P, and they reside in RAM to promote good performance for in-place sorting. The notation described in this context, in an embodiment, corresponds to the system described elsewhere in connection with FIG. 4.

In an embodiment, sorting by permutation is parallelizable regardless of whether an in-place sorting by permutation algorithm, out-of-place sorting by permutation algorithm, or other suitable algorithm is utilized. For example, in connection with the out-of-place sorting by permutation algorithm approach disclosed above, a system, in an embodiment, is extended to partition at least the columns C, P, and sorted_C by rows and assign partitions to distributed processors where each processor sequentially scans its assigned range of rows in C and P and sends messages to peer processors responsible for the ranges of sorted_C including the appropriate destination row. In an embodiment, after this well-balanced computation completes, the processors simply concatenate their ranges of sorted_C into a complete sorted column—it should be further noted that in this implementation, a merge is not required. The notation described in this context, in an embodiment, corresponds to the system described elsewhere in connection with FIG. 4.

In an embodiment, sorting by permutation allows correct sorted order to be imposed on a non-key columns in an on-demand manner (e.g., the sort of some or all non-key columns is performed in response to a request), and has several advantages—for example, the re-arranging of an unsorted array, in an embodiment, involves sequential loads from memory and blind writes to randomly distributed memory locations—the former from the unsorted array and the permutation, the latter to the destination array—this type of performance profile has favorable performance on computer systems where address translation overheads required for random loads can be large and stall the processor pipeline, whereas blind stores to random addresses are less expensive because they do not stall the pipeline. For example, techniques for sorting by permutation can be utilized to improve the performance of systems that encrypt and/or compress data in columns or subsets of columns.

In an embodiment, it is possible to compose permutations to sort repeatedly—for example, if F( ) and G( ) are functions that sort by permutation and C is a column, G(F(C)) is a sorted column. It should be noted that if F( ) and G( ) are functions for sorting by permutation, that the composition of F and G also sorts by permutation and it is possible to condense the composition into a single step sort by permutation that represents the composition. In an embodiment, compositions of sorts are utilized by a system to defer sorting of a non-key column in cases where the primary key column is sorted and re-sorted multiple times. In an embodiment, a key column of a database is sorted a first time based on a first sort order, generating a first permutation column, sorted a second time based on a second sort order, generating a second permutation column, and a non-key column is sorted according to the second sort order by composing the first permutation and the second permutation into a single permutation.

Figure 9:
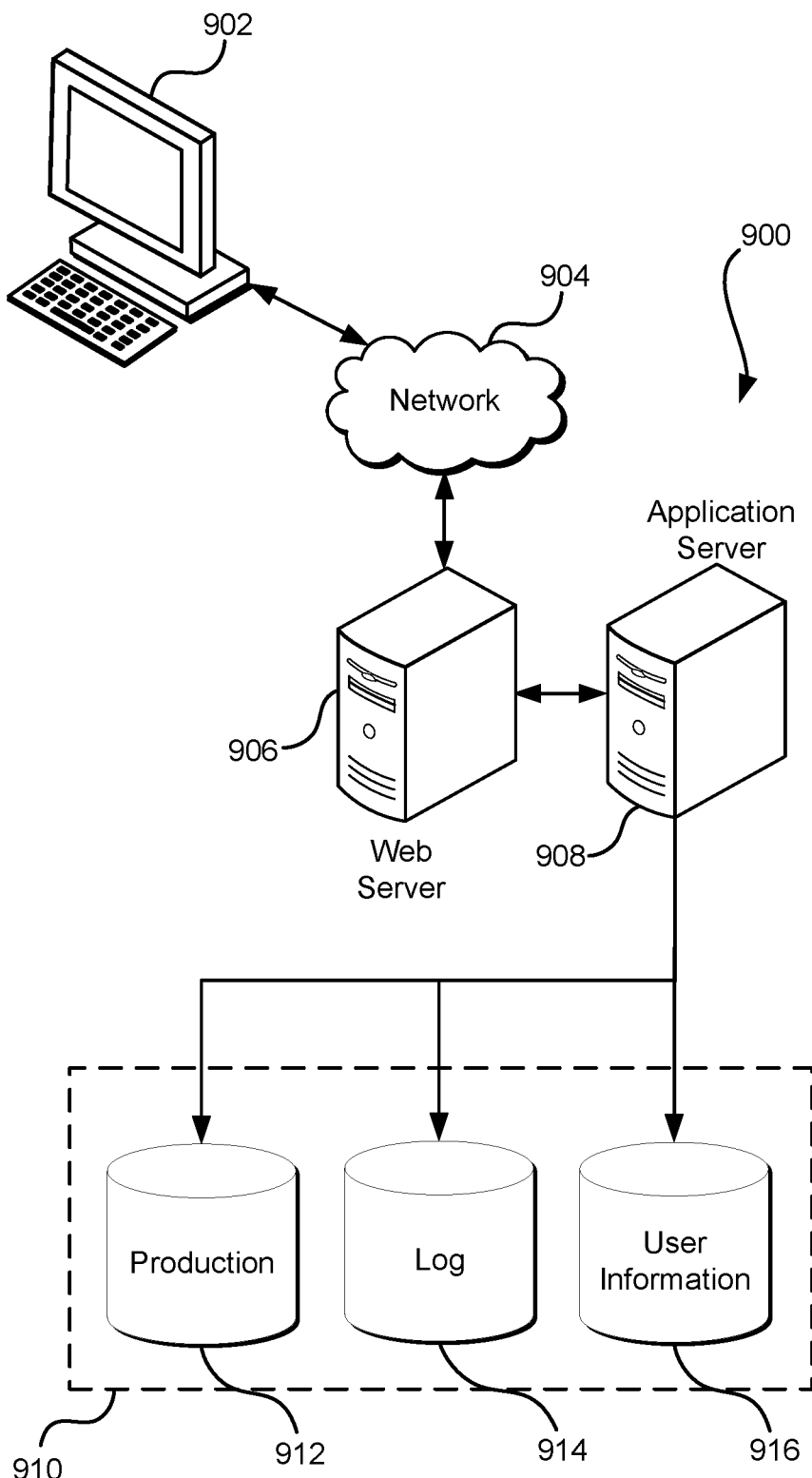
FIG. 9 illustrates a system in which various embodiments can be implemented, in accordance with one embodiment.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto.

The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   without sorting a second column of a database table, using a sorting algorithm to sort a first column of the database table that comprises multiple rows such that a value in a row indicated by a row index of the first column is stored in a different row of the first column;
   generating a permutation column resulting from sorting the first column to track a new sort order for ordering the second column, wherein the permutation column, for a first row of the database table, stores a first index value that indicates an index of the different row of the database table where a second value stored in a second column of the first row should be placed to order the second column;
   storing the permutation column in association with the database table, a mapping table indicating the association, wherein the mapping table is stored separately from the database table; and
   in response to an application programming interface (API) request to access ordered data in the second column:
      obtaining the permutation column based on the mapping table;
      ordering an unsorted array of the second column of the database table based, at least in part, on the API request and the permutation column; and
      providing access to the ordered data in the second column.

2. The computer-implemented method of claim 1, wherein ordering the unsorted array of the second column of the database table comprises:
   reading the first index value from the first row of the permutation column;
   accessing the second value stored in the second column of the first row;
   determining, based at least in part on the first index value from the first row of the permutation column, a different row of the second column; and
   storing the second value in the different row of the second column.

3. The computer-implemented method of claim 1, further comprising ordering an unsorted array of a third column of the database table, wherein the second column and the third column are different columns.

4. The computer-implemented method of claim 1, wherein:
   performing the sorting algorithm has a first average computational cost;
   using the permutation column to sort the second column of the database table has a second average computational cost; and
   the second average computational cost is less than the first average computational cost.

5. A system, comprising one or more non-transitory machine-readable media having stored thereon a set of instructions, which, if performed by one or more processors, cause the system to at least:
   without sorting a second column of a database table, sort at least a portion of a first column of the database table such that a value in a row indicated by a row index of the first column is stored in a different row of the first column;
   generate a permutation rule to track a new sort order for ordering the second column by at least storing, in a permutation column at the row index, an index to the different row as the permutation rule at the row index;
   store the permutation column in association with the database table, wherein the permutation column and the database table are associated in a mapping table, and wherein the mapping table is stored separately from the database table; and
   in response to an application programming interface (API) request to access ordered data in the second column:
      obtain the permutation column based on the mapping table;
      order the second column of the database table based on the API request and the permutation column; and
      provide access to the ordered data in the second column.

6. The system of claim 5, wherein to order the second column, the set of instructions, if performed by the one or more processors, further cause the system to:
   obtain, for the first row of the database table, a first value of the permutation column;
   determine, from the first value, the different row of the database table where a second value, at the second column of the first row, should be placed to impose the new sort order upon the second column; and
   replace a third value, at the second column of the different row, with the second value.

7. The system of claim 6, comprising further instructions, which, if performed by the one or more processors, further cause the system to:
   obtain the third value;
   obtain, for the different row of the database table, a fourth value of the permutation column;
   determine, from the fourth value, another row of the database table where the third value should be placed to impose the new sort order upon the second column; and
   replace a fifth value, at the second column of the other row, with the third value.

8. The system of claim 5, wherein the set of instructions, if performed by the one or more processors, further cause the system to:
   provide instructions to a first computing entity to apply the permutation column to impose the new sort order upon a third column without applying the sorting algorithm to the third column; and
   provide instructions to a second computing entity to apply the permutation column to impose the new sort order upon a fourth column without applying the sorting algorithm to the fourth column, wherein the permutation column is accessed via the mapping table.

9. The system of claim 5, wherein the set of instructions to store the permutation column include instructions that, if performed by the one or more processors, cause the system to store the permutation column as a third column of the database table.

10. The system of claim 5, wherein the set of instructions, if performed by the one or more processors, further cause the system to durably store the permutation column.

11. The system of claim 5, wherein the second column comprises a plurality of rows of data, each row of the plurality encoded in a same data type as other rows of the plurality.

12. The system of claim 11, wherein the second column is stored in a compressed format.

13. A non-transitory computer-readable storage medium having stored thereon executable instructions that, as a result of being executed by one or more processors of a computer system, cause the computer system to at least:
   sort at least a portion of a first column of a database, without sorting a second column of the database, by at least storing a value indicated by a row index of the first column in a different row of the first column;
   determine, based at least in part on sorting the first column, a permutation rule, wherein:
      the permutation rule tracks a new sort order for ordering the second column;
      a first value of the permutation rule corresponds to a first row of the database;
      the first value indicates an index of a different row of the database; and
      the different row of the database is where a second value, stored in the first row at the second column, should be placed in the second column to order the second column;
   store the permutation rule in a permutation column, in association with the database according to a mapping table, to be applied to impose the new sort order upon the second column, wherein the mapping table is stored separately from the database; and
   in response to an application programming interface (API) request, order an unsorted array of the second column of the database, based on the API request and the permutation column associated with the second column in the mapping table.

14. The non-transitory computer-readable storage medium of claim 13, wherein the instructions that cause the computer system to store the permutation rule further cause the computer system to store the permutation rule in a third column of the database.

15. The non-transitory computer-readable storage medium of claim 13, wherein the instructions to sort at least the portion of the first column of the database without sorting the second column of the database include instructions that, as a result of being executed by the one or more processors, cause the computer system to:
   obtain at least the portion of the first column;
   determine, prior to applying a sorting algorithm to at least the portion of the first column, tuples for at least the portion of the first column, wherein a respective tuple for a respective row of at least the portion of the first column stores a respective index value indicating where the respective row is located;
   apply the sorting algorithm to the tuples to obtain sorted tuples, wherein the sorted tuples are sorted based at least in part on the first column; and
   store indices of the sorted tuples as a permutation column representing the permutation rule for each row of at least the portion of the first column.

16. The non-transitory computer-readable storage medium of claim 13, wherein at least part of the first column is stored in a first storage device and at least part of the second column is stored in a different storage device.

17. The non-transitory computer-readable storage medium of claim 13, wherein the instructions that, as a result of being executed by the one or more processors of the computer system, further cause the computer system to at least:
   receive the API request for sorted data from the second column;
   in response to receiving the API request, impose the new sort order upon the second column according to the permutation rule; and
   fulfill the API request using the second column after the second column has been ordered.

18. The non-transitory computer-readable storage medium of claim 13, wherein the instructions, as a result of being executed by the one or more processors of the computer system, further cause the computer system to at least:
   detect an indication to sort the second column;
   obtain, for the first row of the database, the first value of the permutation rule;
   determine, from the first value, the different row of the database where the second value, at the second column of the first row, should be placed to impose the new sort order upon the second column; and
   replace a third value, at the second column of the different row, with the second value.

19. The non-transitory computer-readable storage medium of claim 13, wherein the instructions include further instructions that, as a result of being executed by the one or more processors, cause the computer system to further impose the new sort order on the second column without allocating resources for a destination array or a destination column.

\* \* \* \* \*